United States Patent
Anzai et al.

(10) Patent No.: US 7,404,035 B2
(45) Date of Patent: Jul. 22, 2008

(54) SYSTEM FOR CONTROLLING SPINNING OF DISK

(75) Inventors: Tomoya Anzai, Sagamihara (JP); Yoji Nakatani, Yokohama (JP); Takashige Iwamura, Yokohama (JP); Akira Fujibayashi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 200 days.

(21) Appl. No.: 11/284,099

(22) Filed: Nov. 22, 2005

(65) Prior Publication Data
US 2007/0067560 A1    Mar. 22, 2007

(30) Foreign Application Priority Data
Sep. 20, 2005  (JP) .............................. 2005-271314

(51) Int. Cl.
*G06F 13/10* (2006.01)
(52) U.S. Cl. ..................................................... 711/114
(58) Field of Classification Search ................. 711/114, 711/113; 713/323
See application file for complete search history.

(56) References Cited

U.S. PATENT DOCUMENTS

| | | | |
|---|---|---|---|
| 5,666,538 A * | 9/1997 | DeNicola ..................... | 713/320 |
| 6,826,005 B2 | 11/2004 | Hakamata et al. | |
| 7,210,004 B2 * | 4/2007 | Guha et al. .................. | 711/114 |
| 7,210,005 B2 * | 4/2007 | Guha et al. .................. | 711/114 |
| 2002/0144057 A1 * | 10/2002 | Li et al. ...................... | 711/112 |
| 2004/0054939 A1 | 3/2004 | Guha et al. | |

OTHER PUBLICATIONS

"Massive Arrays of Idle Disks for Storage Archives", Proceedings of the 2002 ACM/IEEE Conference on Supercomputing, D. Colarelli et al, Jul. 26, 2002, pp. 1-11.

* cited by examiner

*Primary Examiner*—Kevin L Ellis
(74) *Attorney, Agent, or Firm*—Mattingly, Stanger, Malur & Brundidge, PC

(57) ABSTRACT

A system for controlling spinning of a disk is provided to prevent deterioration of the access response speed and to suppress the power consumption. The system includes a controller controlling a file system, and a disk array system storing data of the file system. The disk array system includes a plurality of logical volumes, each of which is configured by at least one disk device, and a disk controller controlling data input/output to/from the plurality of logical volumes. The plurality of logical volumes includes at least one first type logical volume which is controlled so that spinning of a disk device that configures the logical volume can be stopped, and at least one second type logical volume which is controlled so that spinning of a disk device that configures the logical volume cannot be stopped. Data satisfying a predetermined condition is stored in the second type logical volume.

5 Claims, 9 Drawing Sheets

FIG. 3

| # | TYPE OF DATA | STORAGE LOCATION LU | CACHE FLAG |
|---|---|---|---|
| 1 | inode INFORMATION | LU0 | 1 |
| 2 | MOUNT INFORMATION | LU0 | 1 |
| 3 | /mnt/fs0/data | LU3 | - |
| ... | ... | ... | ... |
| m | NORMAL DATA | LU1,2 | - |
| ... | ... | ... | ... |
| n | WORM DATA | LU4 | - |
| ... | ... | ... | ... |
| - | THE OTHERS | LU1,2 | - |

| # | LU NUMBER | RELATED LU NUMBER | LAST ACCESS TIME | REGULAR SPINNING FLAG | STOP WAITING TIME | SPINNING STOP TIME |
|---|---|---|---|---|---|---|
| 1 | LU0 | - | 05/07/21 12:34 | 1 | - | - |
| 2 | LU1 | LU2 | 05/07/21 12:25 | 0 | 60(sec) | 05/07/21 12:29 |
| 3 | LU2 | LU1 | 05/07/21 12:28 | 0 | 60(sec) | 05/07/21 12:29 |
| ... | ... | ... | ... | ... | ... | ... |

401

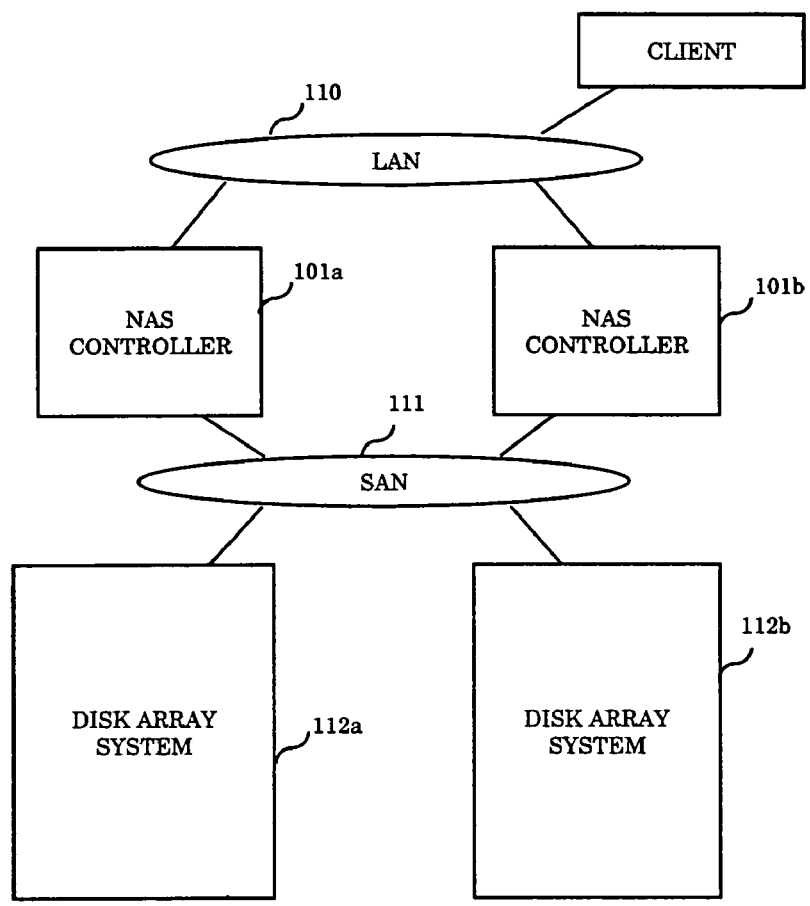

| # | DATA NAME | STORAGE LU NUMBER |
|---|---|---|
| 1 | /mnt/fs0/file1 | LU3 |
| 2 | /mnt/fs2/file2 | LU4 |
| 3 | /mnt/fs3/file0 | - |
| ⋮ | ⋮ | ⋮ |

SYSTEM FOR CONTROLLING SPINNING OF DISK

CROSS-REFERENCE TO RELATED APPLICATIONS

This application relates to and claims priority from Japanese Patent Application No. 2005-271314, filed on Sep. 20, 2005, the entire disclosure of which is incorporated herein by reference.

BACKGROUND OF THE INVENTION

The present invention relates to an apparatus for controlling a file system and a storage system for storing data of the file system.

File services using a NAS (Network Attached Storage) system that functions both as a file server for controlling a file system and as a storage system for storing data of the file system have been recently in demand. Accordingly, as the capacity of data stored in the NAS system increases, the number of disk devices of the storage system in the NAS system increases.

When the number of the disk devices increases, the power consumption of the storage system also increases. In particular, in a large capacity disk array system that is equipped with a plurality of disk devices and has RAID (Redundant Array of Inexpensive Disks) composed of a plurality of disk devices, the storage system consumes too much power.

U.S. Pat. No. 6,826,005 discloses a method of reducing the power consumption of the disk array system by stopping (spinning down) the disk device that is not accessed by an upper-level device for a predetermined time interval.

SUMMARY OF THE INVENTION

However, according to the related art, when frequently accessed data and less frequently accessed data are stored in the same disk device, this disk device is frequently accessed. Thus, the frequency of the spinning down is lowered, and, it is difficult to control the power consumption of the storage system. On the other hand, if the period from the time when the disk device is accessed until the time when spinning is stopped is set to be short in order to frequently stop spinning of the disk device, it may be required to spin up the disk device whenever the disk device is accessed. Accordingly a response to the access may be delayed.

Accordingly, a system is required that can prevent deterioration of a response speed to access and control the power consumption.

A system includes a controller controlling a file system, and a disk array system storing data of the file system. The disk array system includes a plurality of logical volumes, each of which is configured by at least one disk device, and a disk controller controlling data input/output to/from the plurality of logical volumes. The plurality of logical volumes includes the first type logical volume which is controlled to be able to stop spinning of a disk of a disk device that configures the logical volume, and the second type logical volume which is controlled to prevent stopping of the spinning of the disk of the disk device that configures the logical volume. Data satisfying a predetermined condition among data of the file system is stored in the second type logical volume.

Therefore, it is possible to suppress a response delay to an access to data with suppressing the power consumption of a storage system.

BRIEF DESCRIPTION OF THE DRAWINGS

FIG. 3 is an example of file system configuration information;

FIG. 4 is an example of volume management information;

FIG. 7 is a block diagram showing an example of a file sharing system;

FIG. 8 is an example of a file system management table;

DESCRIPTION OF THE PREFERRED EMBODIMENTS

Embodiments according to the present invention will now be described in detail with reference to the accompanying drawings. It is to be understood that the present invention is not limited to the embodiments which will be described for illustrative purposes only.

Embodiment 1

According to the present embodiment, a file system service is provided by using a NAS controller, which functions as a file server, and a storage system.

Figure 1:
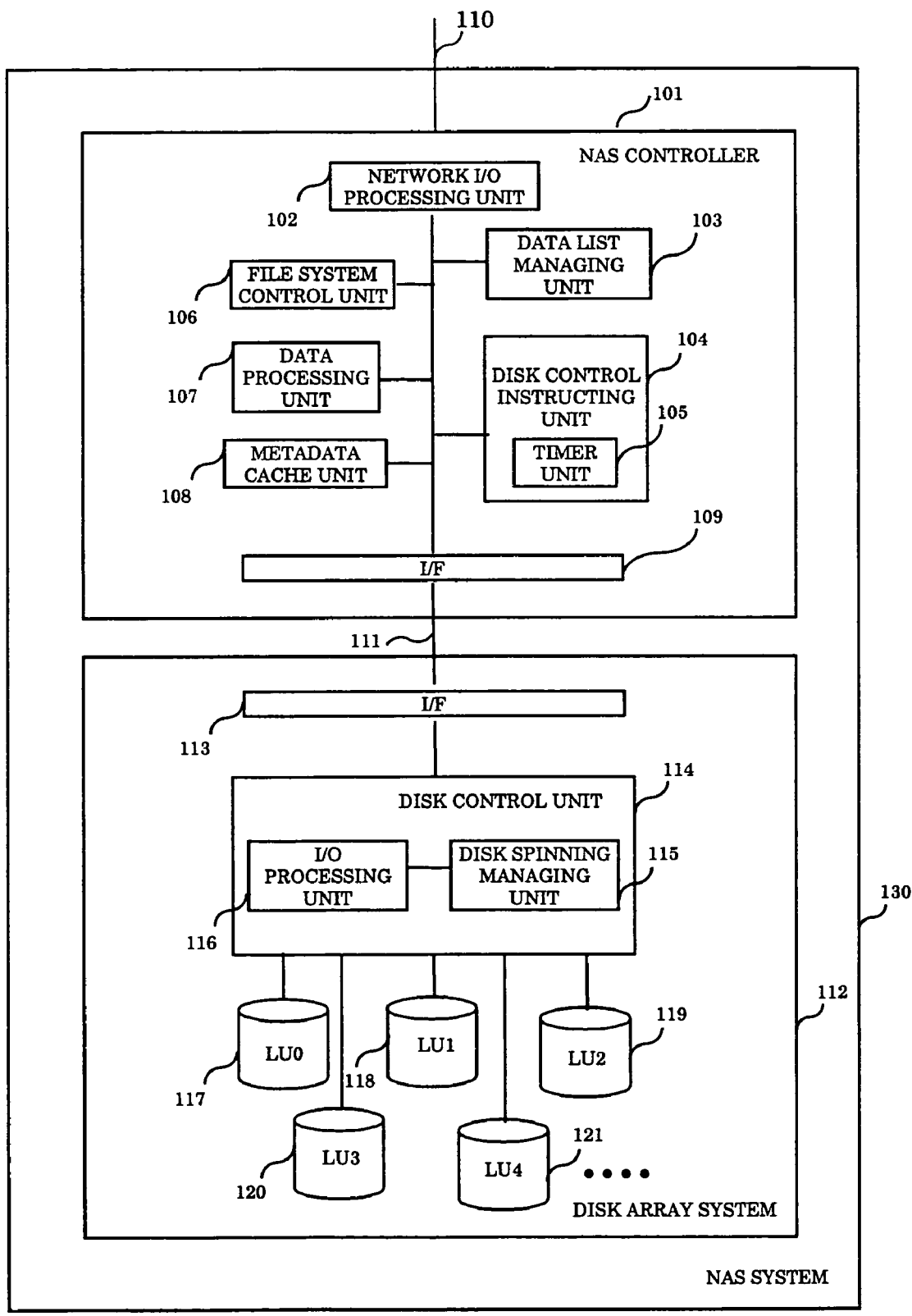
FIG. 1 is a block diagram showing an example of a logical configuration of a NAS system.

FIG. 1 is a block diagram of a logical configuration of a NAS system according to the present embodiment. A NAS system 130 includes a NAS controller 101, which functions as a file sharing device and a file server, and a disk array system 112, which is a storage system for storing data of the file system.

The NAS controller 101 includes a network I/O processing unit 102, a data list managing unit 103, a disk control instructing unit 104, a file system control unit 106, a data processing unit 107, a metadata cache unit 108, and an I/F (interface control unit) 109.

The network I/O processing unit 102 exchanges data with a client or a management terminal through an external network 110. The data list managing unit 103 manages various types of management information such as file system configuration information 301, volume management information 401, a file system management table 701, a WORM data management table 1001, and so on. The disk control instructing unit 104 includes a timer unit 105 that measures time, and instructs the disk array system 112 to start or stop spinning of a disk device. The file system control unit 106 controls the file system, e.g., it instructs to make WORM (Write Once Read Many) file or directory. The data processing unit 107 processes data. The metadata cache unit 108 maintains a copy of metadata. The I/F 109 exchanges data with an I/F 113 included in the disk array system 112 through a communication path 111 such as a SAN (Storage Area Network).

The disk array system 112 includes a disk control unit 114, and a plurality of logical volumes LU0 117, LU1 118, LU2 119, LU3 120, LU4 121, and the like, in addition to the I/F (interface control unit) 113. The number of logical volumes is not limited to the example shown in FIG. 1. The logical volumes LU0 117, LU1 118, LU2 119, LU3 120, LU4 121 store data of a file or data for various kinds of managing for the file system. The disk control unit 114 includes a disk spinning managing unit 115 and an I/O processing unit 116. The I/O processing unit 116 reads/writes data from/to the logical volume. The disk spinning managing unit 115 controls start or stop of spinning a disk of the disk device constituting the logical volume. In the present specification, when explanation is made to the start or stop of spinning of the disk equipped in the disk device, 'spinning of a disk device' implies 'spinning of a disk of a disk device'.

Figure 2:
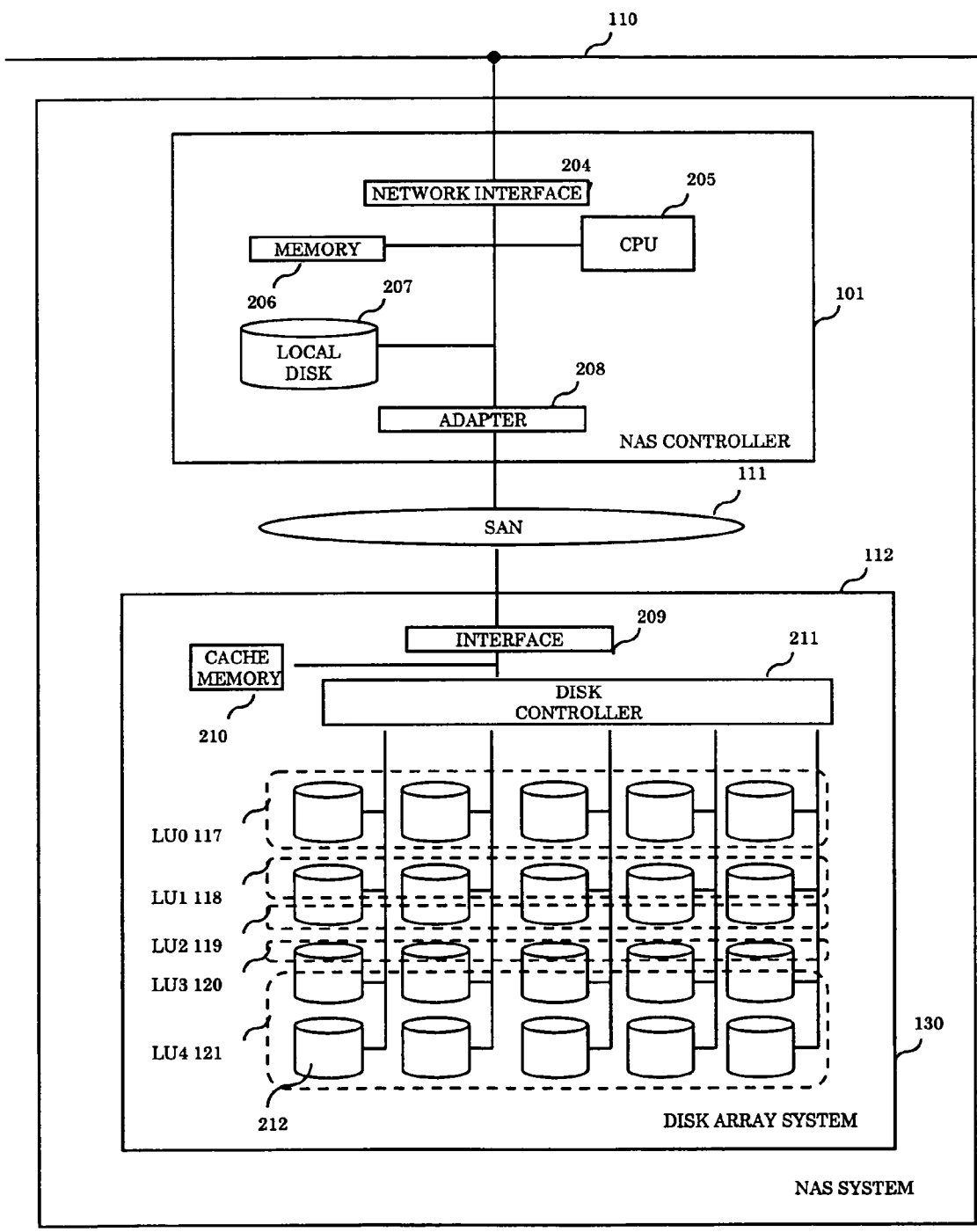
FIG. 2 is a block diagram showing an example of a physical configuration of a NAS system.

FIG. 2 is a block diagram of a physical configuration of a NAS system according to the present embodiment.

A NAS controller 101 includes a network interface 204, a CPU 205, a memory 206, a local disk 207, and an adapter 208, which are connected to communicate with one another through an internal communication path.

A disk array system 112 includes an interface 209, a cache memory 210, a disk controller 211, and a plurality of disk devices 212 connected to the disk controller 211. The interface 209, the cache memory 210, and the disk controller 211 are connected to communicate with one another through the internal communication path.

The NAS controller 101 and the disk array system 112 are connected to each other through the SAN 111. The NAS controller 101 and the disk array system 112 may be connected to each other through a dedicated line or a TCP/IP network other than the SAN 111.

The network interface 204 of the NAS controller 101 exchanges data with an external network 110. The local disk 207 stores various types of management data, such as programs executed in the NAS controller 101, file system configuration information 301, volume management information 401, a file system management table 701, and a WORM data management table 1001.

The memory 206 stores temporary data for reading or processing various data or programs stored in the local disk 207. The CPU 205 performs processes executed in the NAS system 101. The adapter 208 exchanges data with the disk array system 112 through the SAN 111.

The data list managing unit 103, the disk control instructing unit 104, the file system control unit 106, and the data processing unit 107, which are shown in FIG. 1, are configured by executing programs read from the local disk 207 to the memory 206 by means of the CPU 205. The programs may be composed of at least one code configured so that the CPU 205 can execute the following processes.

The metadata cache unit 108 shown in FIG. 1 may be a part of the memory 206, or an additional memory incorporated in the NAS controller 101 that is separately provided from the memory 206, and the memory may be used as the metadata cache unit 108. In addition, when a nonvolatile memory, such as an NVRAM, is used as a memory for the metadata cache unit 108, metadata is maintained in the nonvolatile memory even when the NAS controller 101 is restarted. Accordingly, there is an advantage in that it is not necessary to read the metadata from the disk array system into the metadata cache unit 108 after restarting.

The interface 209 of the disk array system 112 exchanges data with the NAS controller 101 through the SAN 111. The disk controller 211 reads/writes data from/to each disk device 212 or controls spinning of the disk device 212. The cache memory 210 temporarily retains data read/write from/to the disk device 212. Each disk device 212 has a disk, the spinning of which is controlled by the disk spinning managing unit shown in FIG. 1.

A plurality of disk devices 212 are combined to constitute a RAID group, and a logical volume is composed of a part or the entire RAID group. Information concerning the correspondence between the disk device 212 and the RAID group, and the correspondence between the RAID group and the logical volume corresponding to the RAID group is managed within a memory incorporated in the disk controller 211.

The disk controller 211 includes a memory and a CPU, in which the memory stores an I/O processing program and a disk spinning management program which are executed by the CPU (not shown). The disk control unit 114 shown in FIG. 1 is configured when the CPU of the disk controller 211 executes programs in the memory. The I/O processing unit 116 shown in FIG. 1 is configured when the CPU executes the I/O processing program. The disk spinning managing unit 115 shown in FIG. 1 is configured when the CPU executes the disk spinning management program.

FIG. 3 shows an example of file system configuration information 301 managed by the data list managing unit 103. The file system configuration information 301 includes item number 305, type of data 302, storage location LU 303, and cache flag 304.

The type of data 302 is information indicating type of data to be managed. For example, item #1 indicates that the type of data is inode information (inode information is a type of metadata that is management data of a file system). Item #2 indicates that the type of data is mount information that is a type of metadata. Item #3 indicates that data managed in #3 is data managed in a layer equal to or lower than /mnt/fs0/ (i.e., data of a file system identified as "fs0"). Items #m and #n indicate the type of data, which are based on data attributes. Item #n represents the following WORM (Write Once Read Many) data, and item #m represents data having attributes other than metadata or WORM.

The storage location LU 303 indicates information showing LU within the disk array system 112 in which data to be managed is stored. The cache flag 304 indicates whether or not the data to be managed is cached into the metadata cache unit 108 of the NAS controller 101.

In the present embodiment, the cache flag 304 of "1" indicates that the data to be managed is cached into the metadata cache unit 108, while the cache flag 304 of "0" indicates that the data is not cached. The NAS controller 101 may not include the metadata cache unit 108. In this case, the file system configuration information 301 may not include the cache flag 304.

The type of data 302 shown in FIG. 3 is just an example. Other types of data may be recorded in the file system configuration information 301. Not all type of data shown in FIG. 3 needs to be recorded in the file system configuration information 301. The NAS controller 101 may include a plurality of file system configuration information 301 according to the type of file system.

FIG. 4 shows an example of volume management information 401 that is managed by the data list managing unit 103. The volume management information 401 includes an item number 408, a LU number 402, a related LU number 403, a last access time 404, a regular spinning flag 405, a stop waiting time 406, and a spinning stop time 407.

The LU number 402 indicates identification information of logical volume.

The related LU number 403 indicates identification information of LU (hereinafter referred to as "related LU") that shares a disk device with LU identified by the corresponding LU number 402. That is, the related LU indicates LU that belongs to the same RAID group as some LU. Identification information of the related LU of LU identified by the corresponding LU number 402 is registered in the related LU number 403. Accordingly, for example, when identification information of the LU1 118 shown in FIG. 2 is registered in the LU number 402, identification information of the LU2 119 in FIG. 2 that shares a disk device with the LU1 118 is registered in the related LU number 403.

The last access time 404 registers time (i.e., time upon access) measured by the timer unit 105 whenever the corresponding LU is accessed. Accordingly, the last access time 404 indicates the latest access time to the corresponding LU.

The regular spinning flag 405 indicates whether to constantly spin a disk device that configures the corresponding LU. The regular spinning flag 405 of "1" indicates that a disk device is constantly spun regardless of the access frequency or the time elapsed from the last access time. The regular spinning flag 405 of "0" indicates that spinning of a disk device may be stopped.

In FIG. 4, since the regular spinning flag 405 is set to "1" with respect to LU0 that stores metadata, it can be understood that a spinning stop/re-spinning process is not performed with respect to a disk device that configures LU0. The metadata is management data of a file system that indicates storage location of a file or a directory within the disk array system 112. Accordingly, whenever the NAS controller 101 receives an access request, it first needs to access the metadata. Therefore, the metadata is expected to be frequently accessed beforehand. With respect to LU containing such data, when spinning of a disk device that configures LU for storing such data is stopped, spin-up is frequently required whenever the data is accessed, thereby generating a delay time for spin-up. As a result, a response time to an access request is delayed. Accordingly, the regular spinning flag 405 has to be set to "1" with respect to the LU for storing data such as metadata that is expected to be frequently accessed beforehand so that delay of a response time to an access request can be avoided.

In the following embodiments 1 to 5, the regular spinning flag 405 is set to "1" with respect to LU for storing the metadata. However, the setup of the regular spinning flag 405 shown in FIG. 4 is just an example. An LU by which the regular spinning flag 405 is set as "1" is not necessarily an LU in which metadata is stored. For example, an operator of the NAS system 130 may set the regular spinning flag 405 to "1" with respect to LU for storing data that is expected to have higher access frequency than the predetermined criterion. Alternatively, the data processing unit 107 accumulates statistical data of the access frequency of each LU, and the regular spinning flag 405 of the corresponding LU may be reset to "1" when the access frequency is equal to or higher than a predetermined criterion.

When the regular spinning flag 405 is set to "0", the stop waiting time 406 is set in the volume management information 401. The stop waiting time 406 is used to determine the timing for stopping the spinning of a disk device. After the stop waiting time 406 is elapsed from the last access time 404, a spinning stop process of the disk device is executed. That is, if there is no access to the corresponding LU during the stop waiting time 406, a process for stopping the spinning of a disk device that configures the corresponding LU is performed.

The time when the spinning of the disk device is stopped is set as the spinning stop time 407 in the volume management information 401.

The process sequence of embodiment 1 will now be described with reference to FIGS. 1 to 6.

When a file system service is performed by using the NAS system 130 shown in FIG. 1, information for configuring a file system needs to be set for the NAS controller 101. For this, the file system configuration information 301 as shown in FIG. 3 is set in the data list managing unit 103 beforehand. The file system configuration information 301 is input by an operator of the NAS system 130 to the NAS controller 101 through the external network 110. The file system configuration information 301 may be changed, if necessary, after the file system service is initiated. According to the file system configuration information 301, the file system is configured in the NAS system 130, so that the storage location LU for metadata or file data is determined.

The process sequence when a client computer (hereinafter referred to as "client") transmits an access request to the NAS system 130 will now be described with reference to FIG. 5.

When a client issues a request (e.g., READ request, WRITE request, file search, and so on) for accessing data of the file system managed by the NAS controller 101, the network I/O processing unit 102 receives the access request through the external network 110 (s501).

In order to access the data in response to the access request, the NAS controller 101 first obtains a file name or path name, and needs to specify a data storage location on the disk array system 112 in which data to be accessed is stored. Thus, the NAS controller 101 needs to access metadata. When the NAS controller 101 includes the metadata cache unit 108, the data processing unit 107 checks whether or not required metadata is cached in the metadata cache unit 108 (s502).

This is checked by referring to a value of the cache flag 304 with reference to the file system configuration information 301 in FIG. 3, or by retrieving the metadata cache unit 108.

When the metadata is not cached in the metadata cache unit 108 at step s502, or when the NAS controller 101 does not include the metadata cache unit 108 at step s502, the data processing unit 107 searches LU for storing the corresponding metadata with reference to the file system configuration information 301 (s503). The data processing unit 107 reads the metadata from the corresponding LU (s504).

When the metadata is cached in the metadata cache unit 108 at step s502, when the metadata cache unit 108 is configured in a storage area on the same memory 206 at step s502, the cache processing unit 107 reads the corresponding metadata from the metadata cache unit 108 into another storage area of the memory 206 (another working area on the memory 206 used by the CPU 205). On the other hand, when the metadata cache unit 108 is formed as a separate memory from the memory 206, the data processing unit 107 reads the corresponding metadata from the separate memory into the memory 206 (s505).

Next, the data processing unit 107 uses the metadata in the memory 206 to specify access object LU in which the data to be accessed is stored. It checks whether or not a disk device that configures the specified LU is spinning by making reference to the volume management information 401 that is managed by the data list managing unit 103 (s506). When the spinning stop time 407 is set in the volume management information 401, a disk device that configures the corresponding LU is not spinning. When the spinning stop time 407 is not set, the disk device is spinning.

When the disk device that configures the access object LU is not spinning at step s506, the disk control instructing unit 104 instructs the disk control unit 114 of the disk array system 112 to start the spinning of the disk device configuring the LU (s507). At this time, the disk control instructing unit 104 specifies LU to be processed for the disk control unit 114. When the disk control unit 114 receives the instruction to spin up, the disk control unit 114 specifies one or more disk devices that configure the corresponding LU which is an object of the instruction, and the disk spinning managing unit 115 instructs the specified disk device to spin up. As a result, each disk device starts to spin.

The volume management information 401 may further include LU configuration disk device information indicating identification information of a disk device that configures LU, such that the NAS controller 101 can understand identification information of each disk device that configures each LU. In this case, at step s506, the disk control instructing unit 104 specifies a disk device that configures the LU to be processed, designates identification information of the disk device, and instructs the disk control unit 114 to start the spinning of the disk device.

In addition, at step s507, the data processing unit 107 clears the value of the spinning stop time 407 of the volume management information 401.

When the disk device is spinning at step s506, it proceeds to step s508.

At step s508, the data processing unit 107 issues to the disk array system 112 an access request for the access object LU. The disk control unit 114 having received the request performs a process (Read process, Write process or the like) for data stored in the corresponding LU through the I/O processing unit 116 according to the access request, and returns the processed result to the data processing unit 107. The data processing unit 107 having received the result returns a response for the access request to a client based on the received result. The data processing unit 107 updates the last access time 404 of the volume management information 401 with respect to the corresponding LU at the time of issuing the access request to the disk array system 112 (s508).

The data processing unit 107 checks whether to update the metadata as the processed result (for example, change of file size, change of update time or the like) (s509). If there is no need to update, the process is terminated.

If the metadata needs to be updated at step s509, the data processing unit 107 instructs the disk array system 112 to update the metadata stored in LU (LU0 in FIG. 3). The disk control unit 114 having received this instruction updates the metadata stored in the corresponding LU (s510).

The data processing unit 107 checks whether or not the NAS controller 101 includes the metadata cache unit 108, and whether or not the value before the metadata is updated at step s510 is cached in the metadata cache unit 108 (s511). Similarly to the step s502, this is checked by referring to a value of the cache flag 304 of the file system configuration information 301 of FIG. 3, or by retrieving the metadata cache unit 108.

When the metadata is not cached in the metadata cache unit 108, or when the NAS controller 101 does not include the metadata cache unit 108, the process is terminated.

When the metadata is cached in the metadata cache unit 108 at step s511, the data processing unit 107 updates the metadata stored in the metadata cache unit 108 (s512), and the process is terminated.

Figure 6:
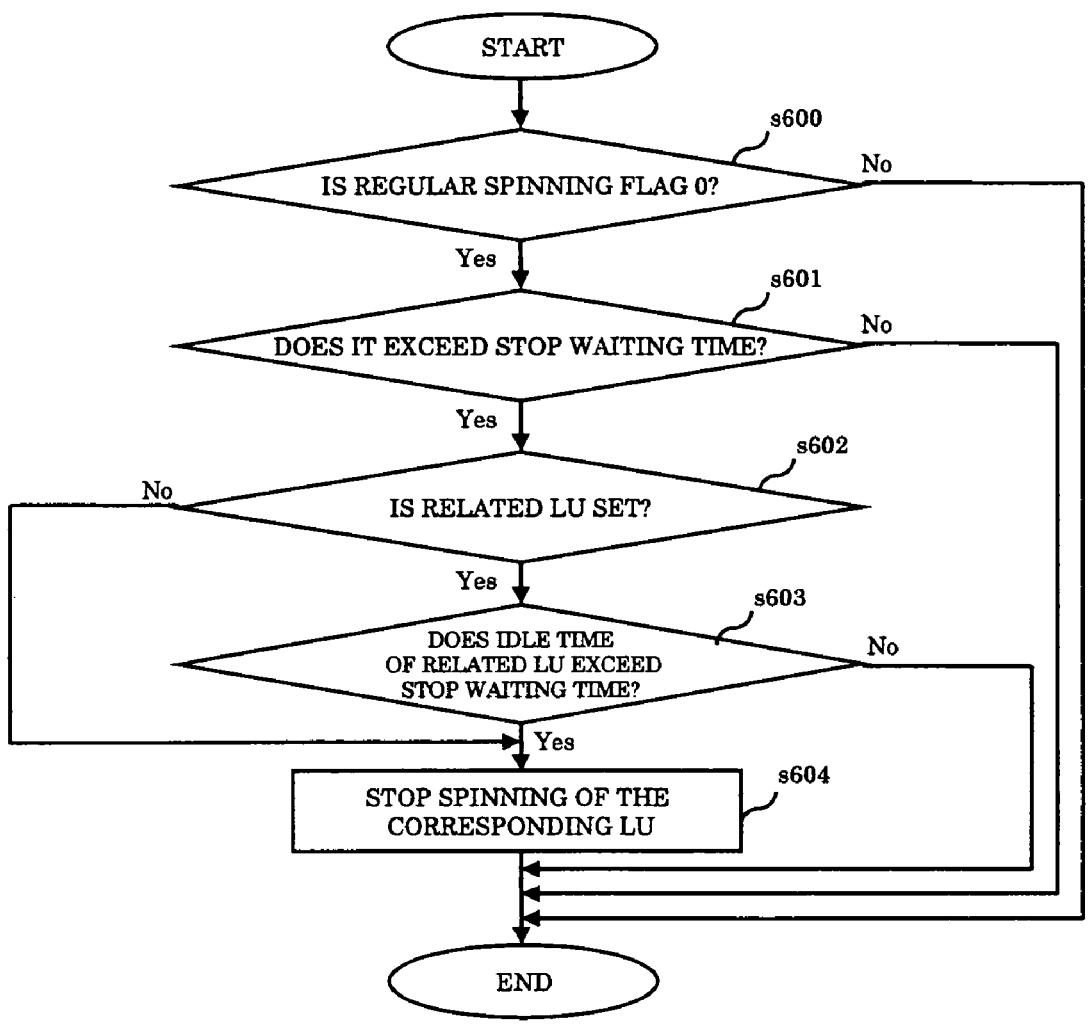
FIG. 6 is a flow chart showing an example of a process for managing the spinning status of a disk device.

Management of the spinning status of a disk device in the NAS system 130 will now be described. The NAS controller 101 manages the spinning status of the disk device that configures LU of the disk array system 112 by means of the disk control instructing unit 104 constantly (or at regular intervals). A process performed by the disk control instructing unit 104 to manage the spinning status of the disk device is shown in FIG. 6.

The disk control instructing unit 104 includes a timer unit 105 that measures current time, and monitors the last access time 404 for all LUs registered in the volume management information 401 that is managed by the data list managing unit 103. It performs steps s600 to s604 for each LU that is registered in the volume management information 401.

First, the disk control instructing unit 104 checks the regular spinning flag 405 of LU to be processed (s600). When the regular spinning flag 405 is set to "1", a disk device that configures the corresponding LU needs to be constantly spun. Accordingly, since a spinning stop instruction is not required, the process for the corresponding LU is terminated.

When the regular spinning flag 405 is set to "0" at step s600, the disk control instructing unit 104 checks whether or not a difference between the current time indicated by the timer unit 105 and the last access time 404 of the corresponding LU exceeds the stop waiting time 406 (s601). If difference between the current time indicated by the timer unit 105 and the last access time 404 of the corresponding LU does not exceed the stop waiting time 406, the process for the corresponding LU is terminated.

When the difference between the current time indicated by the timer unit 105 and the last access time 404 of the corresponding LU exceeds the stop waiting time 406 of the corresponding LU at step s601, the disk control instructing unit 104 checks whether or not the related LU number 403 is set in the corresponding LU (s602).

If the related LU number 403 is not set in the corresponding LU at step s602, the disk control instructing unit 104 instructs the disk spinning managing unit 115 of the disk control unit 114 to stop spinning of the disk device that configures the corresponding LU, and sets the current time indicated by the timer unit 105 in the spinning stop time 407 of the volume management information 401 (s604).

At this time, the disk control instructing unit 104 designates LU for which a spinning stop process is to be stopped, and issues a spinning stop instruction to the disk spinning managing unit 115. The disk spinning managing unit 115 specifies a disk device that configures LU designated by the disk control instructing unit 104, and stops spinning of the specified disk device.

Figure 5:
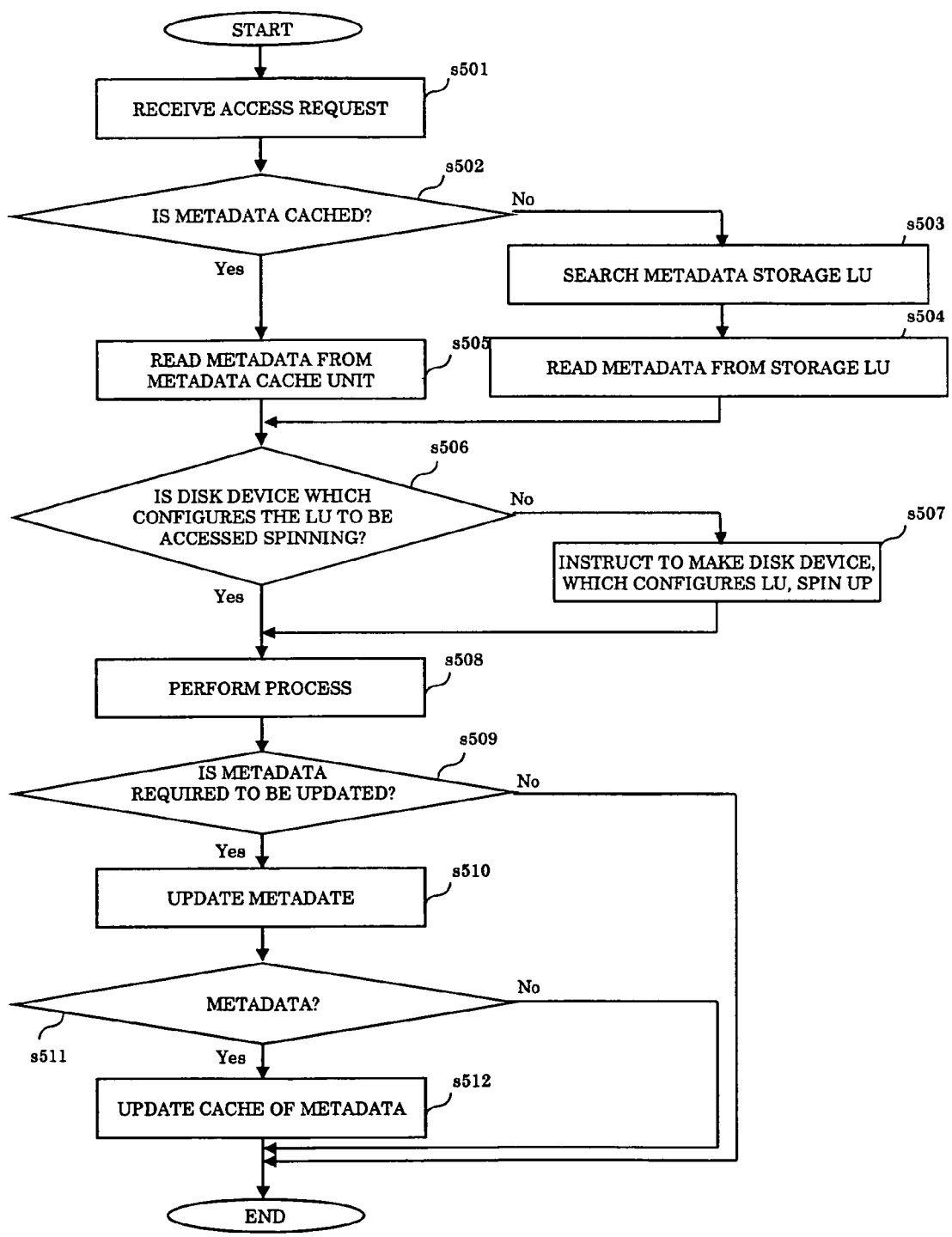
FIG. 5 is a flow chart showing an example of a process sequence of an access request.

Similarly to the step s507 of FIG. 5, the volume management information 401 may further include LU configuration disk device information, such that the NAS controller 101 can determine identification information of each disk device that configures each LU. In this case, at step s604, the disk control instructing unit 104 specifies a disk device that configures the LU to be processed, designates identification information of the disk device, and issues instruction of termination of spinning to the disk spinning managing unit 115.

When the related LU number 403 is set in the corresponding LU at step s602, the disk control instructing unit 104 checks whether or not a difference between the last access time 404 of the corresponding related LU and the current time indicated by the timer unit 105 is larger than the stop waiting time 406 of the corresponding related LU by making reference to the volume management information 401 concerning the related LU that is indicated by the related LU number 403 (s603). Unless the difference between the last access time 404 and the current time is larger than the stop waiting time 406, the process for the corresponding LU is terminated. In addition, at step s603, when the stop waiting time 406 is not registered in the volume management information 401 with respect to the related LU, the process is also terminated.

When the difference between the last access time 404 and the current time is larger than the stop waiting time 406 with respect to the related LU at step s603, the disk control instructing unit 104 instructs the disk spinning managing unit 115 of the disk control unit 114 to make the disk device, which includes the LU to be originally monitored and the related LU, to stop spinning, and sets the spinning stop time 407 in the volume management information 401 with respect to both the LU to be monitored and the related LU (s604).

According to the above-mentioned embodiment 1, LU for storing data, such as metadata, that is expected to be frequently accessed, is set to make a disk device, which configures the corresponding LU, spin constantly. Other LUs are set to make a disk device, which configures the corresponding LU, stop spinning when it is not accessed during a predetermined time interval. As a result, it is possible to prevent deterioration of an access response time with respect to the frequently accessed data. In addition, it is possible to suppress the power consumption with respect to the less frequently accessed data by stopping spinning of the disk device that configures the LU, thereby efficiently reducing the power consumption of the NAS system 130.

Further, in order to reduce the power consumption of the whole NAS system 130 more efficiently, the NAS system 130 is preferably configured such that LU for storing frequently accessed data and LU for storing less frequently accessed data do not belong to the same RAID group. Accordingly, based on information concerning LU set on the disk control unit 114, information concerning RAID group to which the corresponding LU belong, and information concerning at least one disk device that configures the corresponding RAID group, an operator of the NAS system 130 may set the file system configuration information 301 shown in FIG. 3 in the NAS controller 101 so that the LU for storing the less frequently accessed data and the LU for storing the frequently accessed data cannot share the same disk device.

For example, the file system configuration information 301 may be configured so that LU for storing metadata and LU for storing data of a file do not belong to the same RAID group. Also, the file system configuration information 301 may be configured so that the metadata is stored in LU that corresponds to the RAID group in a ratio of 1:1 (i.e., in a case where a single LU corresponds to a single RAID group).

In the present embodiment, when the metadata is accessed (s504 or s505 in FIG. 5), a disk device is spun up (s507 in FIG. 5). Generally, in a file system, when there is a request for access to a file, the metadata is first accessed, and a storage location of the file data or an attribute of the file is checked by using the metadata. After that, a process is performed for access to a storage area in which the file data is stored. Accordingly, if an instruction to make the disk device spin up is issued when the metadata is accessed, a spin-up process of the disk device can be performed while a process using the metadata, for example, checking of a file attribute, is being performed. Accordingly, it is possible to reduce or remove a waiting time of the disk device until completion of the spin-up process.

According to the present embodiment, a file sharing service is provided by using a plurality of NAS systems 130 as shown in Embodiment 1 and linking those pluralities of NAS systems 130 in association. Embodiment 2 has much common parts with Embodiment 1 and a description concerning the same parts as Embodiment 1 will thus be omitted.

FIG. 7 is a block diagram of a file sharing system according to Embodiment 2. The file sharing system includes a plurality of disk array systems 112a, 112b, and a plurality of NAS controllers 101a, 101b. The disk array systems 112a, 12b and the NAS controllers 101a, 101b are connected to communicate with each other through a communication path such as a SAN 111. The NAS controllers 101a, 101b are connected to communicate with a client through an external network 110 such as LAN (Local Area Network). Hereinafter, if necessary, the plurality of disk array systems 112a, 112b may also be referred to as a disk array system 112, and the plurality of NAS controllers 101a, 101b may also be referred to as a NAS controller 101. The NAS controller 101, the disk array system 112, and the number of clients in FIG. 7 are just an example and, therefore, they are shown for illustrative purposes only.

In FIG. 7, the NAS controller 101a and the disk array system 112a configure the NAS system 130a, and the NAS controller 101b and the disk array system 112b configure the NAS system 130b. That is, the NAS controller 101a has file system configuration information 301a concerning file data or metadata stored in the disk array system 112a, and volume management information 401a concerning LU or disk device of the disk array system 112a. Similarly, the NAS controller 101b has file system configuration information 301b concerning file data or metadata stored in the disk array system 112b, and volume management information 401b concerning LU or disk device of the disk array system 112b. If necessary, the plurality of NAS systems 130a, 130b may be also referred to as simply a NAS system 130.

The configuration of the NAS controller 101, the disk array system 112, and the NAS system 130 is almost the same as that of Embodiment 1, and only the difference between Embodiment 1 and Embodiment 2 will thus be described.

In the present embodiment in which a plurality of NAS systems 130 linked with one another to provide a file sharing service, one or both of the NAS controller 101a and the NAS controller 101b further have a file system management table 701 (shown in FIG. 8) that indicates the correspondence between identification information of a file system and identification information of the NAS controller 101 for managing the file system, in addition to the configuration illustrated in Embodiment 1. A request for access to a file from a client is processed by the NAS controller 101 that has the file system management table 701, for example, according to the following two methods.

Method 1

Based on a file system name included, the NAS controller 101 managing the file system is specified with reference to the file system management table 701. When the specified NAS controller 101 is itself, the NAS controller 101 performs an access process according to the access request based on file system configuration information 301 or volume management information 401 managed by it self. On the other hand, when the specified NAS controller 101 is a different NAS controller 101, the access request received from the client is transferred to the different NAS controller 101.

Method 2

A NAS controller 101 specifies a NAS controller 101 that manages a file system to be accessed with reference to a file system management table 701. When the specified NAS controller 101 is itself, the access process is performed same as Method 1. However, when the specified NAS controller 101 is a different NAS controller 101, unlike Method 1, the NAS controller 101 notifies identification information of the specified NAS controller 101 to a client, and instructs the client to access a different NAS controller 101 according to the identification information.

FIG. 8 shows an example of a file system management table 701 that is managed by the data list managing unit 103 of the NAS controller 101 according to Embodiment 2. As described above, all the NAS controllers 101 included in the file sharing system may have the file system management table 701, or part of the NAS controllers 101 may have it.

The file system management table 701 has item number 704, NAS controller name 702, and file system name 703. Identification information of a file system that is managed by the NAS controller 101 that the NAS controller name 702 indicates is set to the corresponding file system name 703. The file system name 703 is information that is included in an access request to specify a file or a directory to be accessed when a client issues the access request to the NAS controller 101. Therefore, the NAS controller 101 can specify which NAS controller 101 manages an object to be accessed by the client by using the access request received by the client and the file system management table 701.

FIG. 9 is a flow chart showing an example of a process procedure of an access request according to Embodiment 2. The access process according to the present embodiment is almost the same as the process procedure shown in FIG. 5 except for the step s501 in FIG. 5, which will now be described using FIG. 9.

Figure 9A:
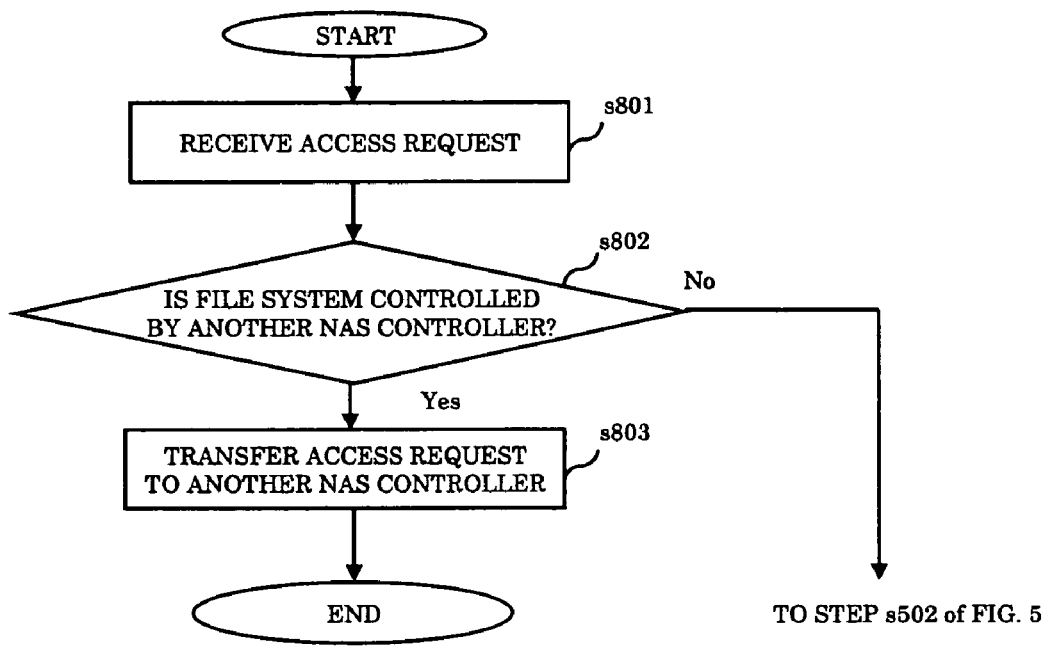
FIG. 9A is a flow chart showing an example of a process procedure of an access request according to Embodiment 2.

FIG. 9A is a flow chart showing an example of a process performed by the NAS controller 101 instead of the step s501 of FIG. 5, when a process for an access request (hereinafter, also referred to as "access process") is performed by using the above-mentioned Method 1.

When a request for access to a file system from a client is issued, a network I/O processing unit 102 of a NAS controller 101 having a file system management table 701 receives the access request through an external network 110 (s801).

Next, a data processing unit 107 of the NAS controller 101 having received the access request checks with reference to the file system management table 701 whether data to be accessed is data of a file system controlled by the NAS controller 101 itself or data of a file system controlled by another NAS controller 101 (s802).

As a result of step s802, when the data to be accessed is data of a file system controlled by the NAS controller 101 itself, it proceeds to step s502 of FIG. 5. The following process is the same process as shown in FIG. 5.

On the other hand, when the data to be accessed is data of a file system controlled by the other NAS controller 101 at step s802, the data processing unit 107 transmits the access request received from a client to the data processing unit 107 of the other NAS controller 101 by using a NAS controller name 702 of the other NAS controller that is set in the file system management table 701, and instructs the data processing unit 107 of the other NAS controller 101 to perform the access process shown in FIG. 5 (s803). After that, the process is terminated.

In the other NAS controller 101 having received the access request, the following process shown in FIG. 5 is performed. However, when the other NAS controller 101 has the file system management table 701, the process after step s502, which is shown in FIG. 5, may be performed after the process shown in FIG. 9A in the other NAS controller 101.

Figure 9B:
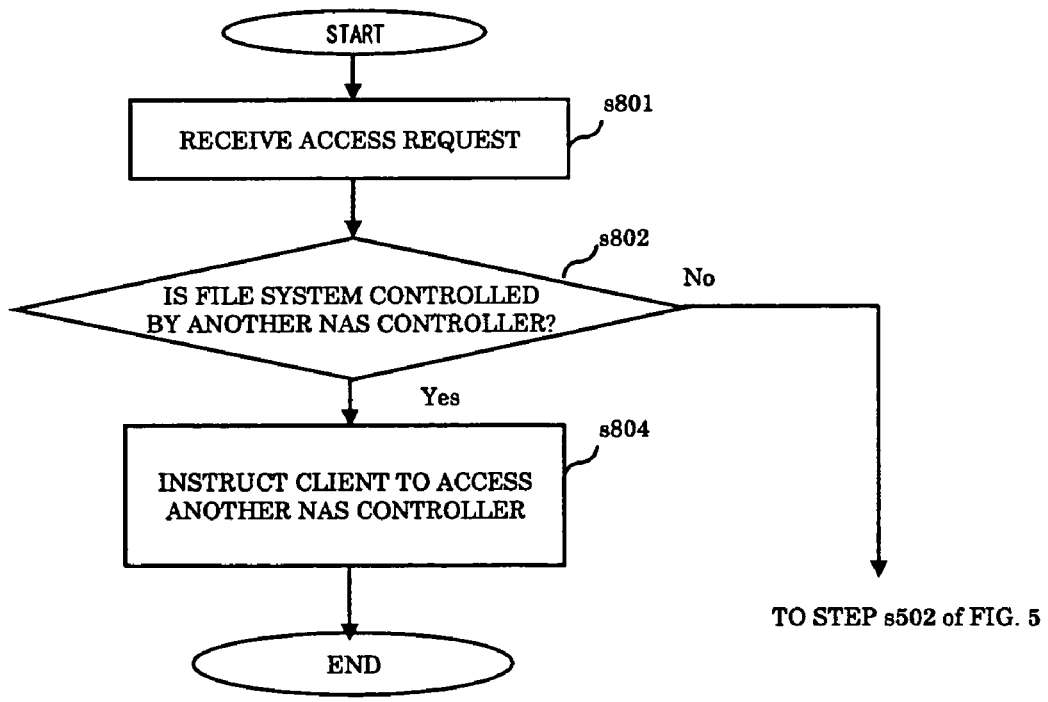
FIG. 9B is a flow chart showing an example of another process procedure of an access request according to Embodiment 2.

FIG. 9B is a flow chart of a process performed by the NAS controller 101 instead of step s501 of FIG. 5, when an access process is performed by using the above-mentioned Method 2. The process of FIG. 9B is almost the same as that of FIG. 9A, except that the step s803 of FIG. 9A is substituted by the step s804 of FIG. 9B. Accordingly, only the difference between FIG. 9A and FIG. 9B will now be described.

In FIG. 9B, when data to be accessed is data of a file system controlled by another NAS controller 101 at step s802, the data processing unit 107 notifies a NAS controller name 702 of the other NAS controller, which is set in the file system management table 701, to a client and instructs the client to issue an access request to the other NAS controller 101 (s804). After that, the process is terminated.

The client having received the instruction issues an access request to the other NAS controller 101. Next, the other NAS controller 101 performs the process shown in FIG. 5. When the other NAS controller 101 has the file system management table 701, the process after the step s502 of FIG. 5 may be performed after the process shown in FIG. 9B in the other NAS controller 101.

In addition to the process shown in FIG. 9B, after step s804, the data processing unit 107 may transmit the access request to the other NAS controller 101, and instruct the other NAS controller 101 to read metadata into the memory 206 in response to the access request and to make a disk device, which configures LU for storing data to be accessed, spin up in advance. The data processing unit 107 of the other NAS controller 101 having received the instruction may prepare the metadata required for the access process on the memory 206 before receiving the access request from the client. Also, the disk control instructing unit 104 of the other NAS controller 101 may spin-up a disk device to be accessed before receiving the access request from the client. Accordingly, it is possible to improve the response performance to the access request.

Also, in Embodiment 2, the disk control instructing unit 104 of each NAS controller 101 manages the spinning status of a disk device included in a disk array system 112 belonging to the same NAS system 130 to which the disk control instructing unit 104 belongs. The management method is the same as that of Embodiment 1 that is shown in FIG. 6, and a detailed description thereof will thus be omitted.

According to the above-mentioned Embodiment 2, also in the file sharing system that uses a plurality of NAS systems 130, it is possible to prevent deterioration of an access response time and to suppress the power consumption of the file sharing system.

Embodiment 3

In the present embodiment, the NAS controller 101 searches data of a WORM file or directory, the data is transferred to LU whose regular spinning flag 405 is set to "0" (i.e., LU configured by a disk device that does not always spin) when the WORM data is found, and spinning of the disk device that configures the LU is stopped, thereby reducing the power consumption of the NAS system 130.

The term "WORM" is an abbreviation for "Write Once Read Many" which is a type of an attribute of a file, a directory, and a logical volume. In a WORM file, a WORM directory, or a WORM LU, a read operation can be performed many times but a write operation can be performed only once. In addition, update, appending-write, or delete operation for the file, directory, and LU is not permitted.

When update or appending-write operation to a file or a directory is completed and then the file or directory is used to only read, a WORM attribute may be assigned to the file or directory, or the file or directory may be stored in a WORM LU. For example, an archive file or a LU for storing the archive file is an example of the WORM data or WORM LU. In general, the WORM file or directory is not frequently accessed but is stored as archive data. Accordingly, when such data is migrated to LU whose regular spinning flag is set to "0" and spinning of a disk device that configures the LU is stopped, less frequently accessed data can be collectively stored in a specific LU and the disk device that configures the LU can be made to stop spinning. Accordingly, it is possible to prevent deterioration of an access response time and to reduce the power consumption of the NAS system 130.

Embodiment 3 can be adapted to both the NAS system 130 of Embodiment 1 and the file sharing system of Embodiment 2. In these cases, the NAS controller 101 further includes a WORM data management table 1001.

Figures 10, 11:
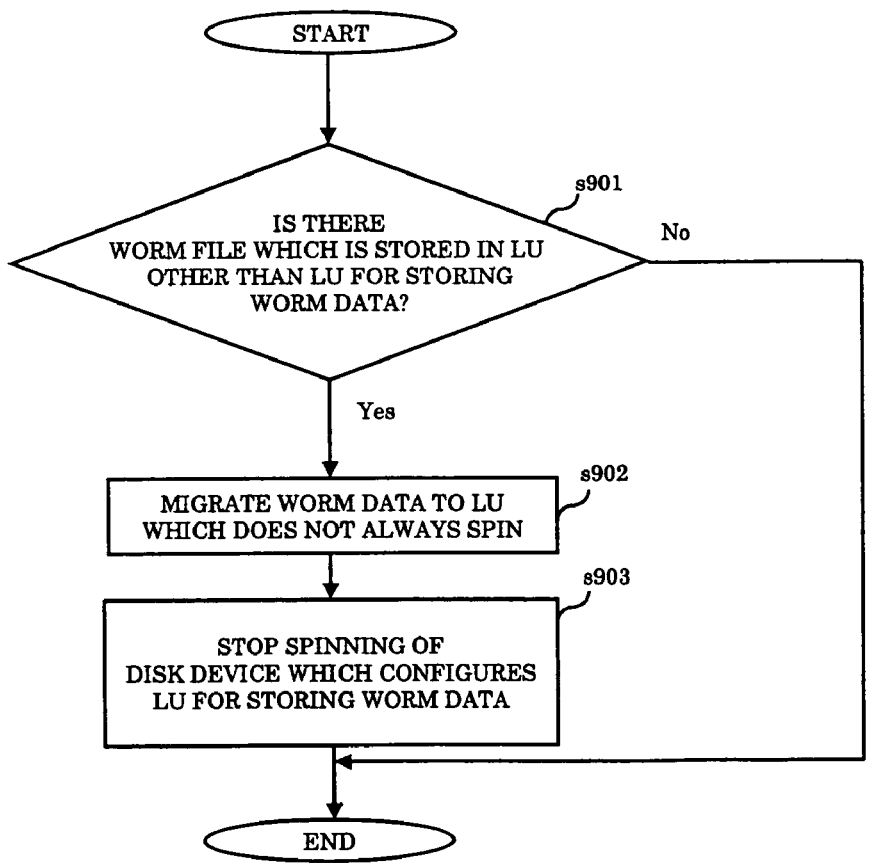
FIG. 10 is a WORM data management table.
FIG. 11 is a flow chart showing an example of a process for migrating WORM data.

FIG. 10 shows a WORM data management table 1001 that is managed by the data list managing unit 103 of the NAS controller 101. The WORM data management table 1001 has item number 1004, data name 1002 that is a path name of a file or a directory, and storage LU number 1003 that is identification information of LU for storing data of the corresponding file or directory. When a WORM file or directory is stored in LU (LU for WORM data) configured by a disk device that does not always spin by the following migration process, null value (denoted by "–" in FIG. 10) is set in the storage LU number 1003 by the file system control unit 106.

Also, in the present embodiment, LU for storing WORM data is provided beforehand, and "WORM data" is registered as type of data 302 and identification information of the LU for storing the WORM data is registered as storage location LU 303 in the file system configuration information 301 shown in FIG. 3. Also, the regular spinning flag 405 of the volume management information 401 shown in FIG. 4 is set to "0" for the LU for storing the WORM data so that a disk device configuring the corresponding LU does not always spin.

When LU for storing the WORM data and LU for storing frequently accessed data belong to the same RAID group, a related LU is frequently accessed even though the regular spinning flag 405 of the LU for storing the WORM data is set to "0". As a result, it is not possible to stop spinning of the disk device that configures the LU. Accordingly, the LU for storing the WORM data and the LU for storing the frequently accessed data preferably belong to different RAID groups from each other.

For example, LUs that do not share a RAID group with other LUs, or LUs that share a RAID group only for LUs for WORM data are provided as LUs for WORM data (i.e., a single LU that is used as LU for WORM data belongs to a single RAID group, or all of a plurality of LUs that are used as LU for WORM data belongs to a single RAID group).

In the present embodiment, an operator of the NAS system 130 or a user issues an instruction to the NAS system 130 to make WORM file data or WORM directory data through the external network 110. The file system control unit 106 of the NAS controller 101 having received the instruction through the network I/O processing unit 106 makes WORM file data or WORM directory data in response to the instruction. The file system control unit 106 sets in the WORM data management table 1001 a path name (which is designated by an operator or user when he/she instructs to make WORM file or directory) of the WORM file or directory as the data name 1002, and sets identification information of LU for storing the WORM file or directory as the storage LU number 1003.

FIG. 11 is a flow chart of a process for migrating data of a WORM file to LU configured by a disk device that does not always spin.

The file system control unit 106 searches the WORM data management table 1001 at regular intervals (e.g., daily), and checks whether there is WORM file data or WORM directory data that is not migrated to LU for WORM data (s901). This is performed by checking whether or not there is a file or directory that has a value other than a null value in the storage LU number 1003 of the WORM data management table 1001.

When there is no corresponding data at step s901, the process is terminated.

When there is WORM file or directory that is stored in LU other than LU for storing the WORM data at step s901, the file system control unit 106 checks the file system configuration information 301 of the data list managing unit 103, specifies the LU for storing the WORM data, and migrates the WORM data to the corresponding LU (s902). Also, the file system control unit 106 updates the storage LU number 1003 of the WORM data management table 1001, and sets the storage LU number 1003 corresponding to the migrated data to a null value. The file system control unit 106 changes metadata or the like as the data is migrated.

After migrating the data, the disk control instructing unit 104 instructs the disk control unit 114 of the disk array system 112 to stop spinning of the disk device that configures the migrated LU for storing the WORM data, and sets the spinning stop time 407 in the volume management information 401 (s903). In the disk control unit 114 having received the instruction from the disk control instructing unit 104, the disk spinning managing unit 115 stops the spinning of the disk device that configures the corresponding LU. In addition, it may stop the spinning of the disk device according to the process sequence shown in FIG. 6 instead of step s903.

According to Embodiment 3, since the WORM data that is expected to be less frequently accessed is stored in the LU whose regular spinning flag 405 is set to "0", it is possible to stop spinning of the disk device in which such data is stored. Accordingly, it is possible to reduce the power consumption of the NAS system 130.

Embodiment 4

According to the present embodiment, when the file and the directory are subjected to WORM, by taking the WORM operation as this opportunity, the power consumption of a NAS system 130 is reduced by migrating WORM file data or WORM directory data to LU configured by a disk device that does not always spin, and stopping the spinning of the disk device that configures the corresponding LU.

Similarly to Embodiment 3, Embodiment 4 can be applied both to the NAS system 130 of Embodiment 1 and to the file sharing system of Embodiment 2. In Embodiment 4, since data migration is performed to make a WORM file or directory by taking the WORM operation as this opportunity, the WORM data management table 1001 is not required. However, other components that configure the NAS system 130 are required as in Embodiment 3. Accordingly, it is necessary that the file system configuration information 301 is set to be similar to that of Embodiment 3 in order to provide LU for WORM data. Additionally, in the volume management information 401, the regular spinning flag 405 of LU for the WORM data needs to be set to "0".

Figure 12:
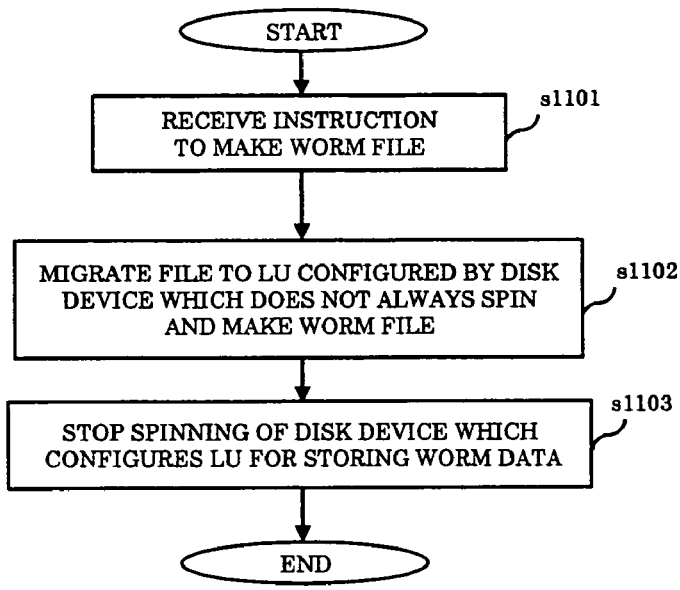
FIG. 12 is a flow chart showing an example of another process for migrating WORM data.

FIG. 12 is a flow chart of a process for migrating data of a WORM file to the LU configured by a disk device that does not always spin.

When an operator of the NAS system 130 or a user issues an instruction to make a WORM file or directory, the file system control unit 106 receives the instruction through the network I/O processing unit 102 of the NAS controller 101 (s1101).

The file system control unit 106 checks the file system configuration information 301 that is managed by the data list managing unit 103, specifies LU for WORM data, migrates a file or directory to the corresponding LU, and assigns a WORM attribute to the file or directory (s1102). In addition, when WORM LU is configured in the disk array system 112 beforehand, and the WORM LU is set as LU for the WORM data in the file system configuration information 301 or the volume management information 401, the file system control unit 106 has to only migrate the file or directory to the WORM LU without the need to assign a WORM attribute to the file or directory. Similarly to Embodiment 3, the file system control unit 106 updates the metadata as the file or directory is migrated.

After migrating the file or directory, the disk control instructing unit 104 instructs the disk control unit 114 of the disk array system 112 to stop spinning of the disk device that configures the LU for storing WORM data, and sets the spinning stop time 407 in the volume management information 401 (s1103). In the disk control unit 114 having received the instruction from the disk control instructing unit 104, the disk spinning managing unit 115 stops spinning of the disk device that configures the corresponding LU. It may stop spinning of the disk device according to the process sequence shown in FIG. 6 instead of step s903.

Similarly to Embodiment 3, according to Embodiment 4, since the WORM data that is expected to be less frequently accessed is stored in LU whose regular spinning flag 405 is set to "0", it is possible to stop the spinning of the disk device in which such data is stored. Accordingly, it is possible to reduce the power consumption of the NAS system 130.

Embodiment 5

According to the present embodiment, when data stored in the NAS system 130 or logical volume included in the NAS system 130 becomes WORM data or WORM LU, by taking the WORM operation as this opportunity, the power consumption of the NAS system is reduced by making a disk device, which configures LU for storing the WORM data or configures the WORM LU, as a disk device that does not always spin.

Embodiment 5 can be applied to both the NAS system 130 of Embodiment 1 and the file sharing system of Embodiment 2.

Figure 13:
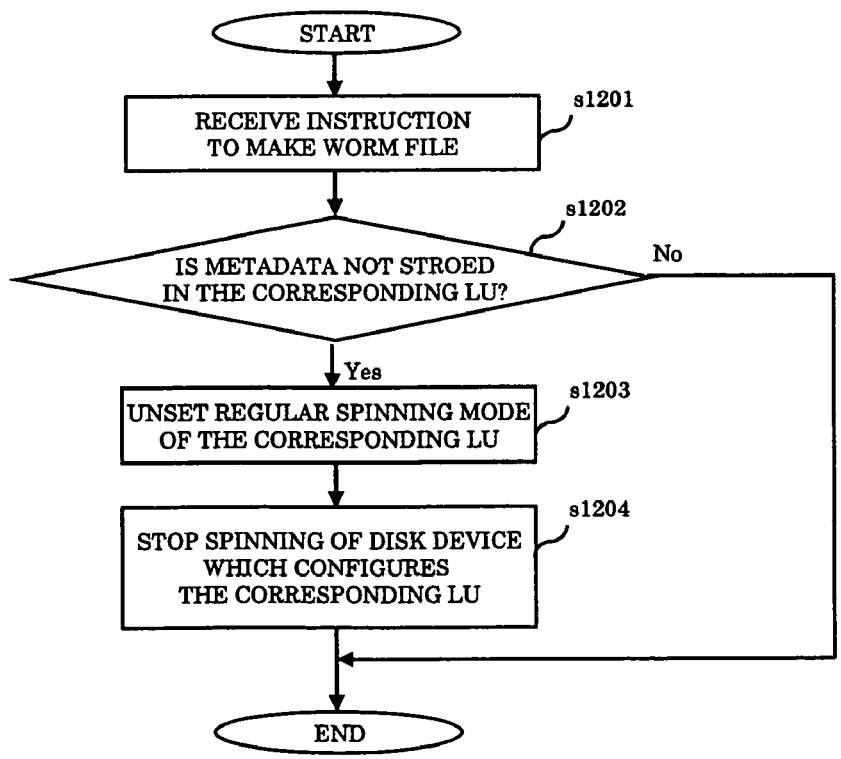
FIG. 13 is a flow chart showing an example of a process for making WORM data or WORM LU.

FIG. 13 is a flow chart of a process for making WORM data or volume according to the present embodiment.

When an operator of the NAS system 130 or a user issues an instruction to make WORM file data or WORM directory data or WORM LU, the file system control unit 106 receives the instruction through the network I/O processing unit 102 of the NAS controller 101. In the case of making the WORM file or directory, the file system control unit 106 makes WORM file or directory. In the case of making the WORM LU, the file system control unit 106 instructs the disk control unit 114 to make WORM LU (s1201).

Next, the file system control unit 106 searches the file system configuration information 301 that is managed by the data list managing unit 103, and checks whether or not metadata (e.g., information concerning inode, mount, or the like) is stored in LU for storing file data or directory data that is to be WORM file data or directory data, or in LU that is to be WORM LU (s1202).

When the metadata is stored in the corresponding LU, the process is terminated.

When the metadata is not stored in the corresponding LU at step s1202, the file system control unit 106 checks the regular spinning flag 405 for the corresponding LU with reference to the volume management information 401. When the regular spinning flag 405 is set to "1", the file system control unit 106 resets it to "0". When the regular spinning flag 405 is set to "0", the file system control unit 106 unsets the regular spinning mode of the corresponding LU without changing the regular spinning flag 405 (s1203).

After unsetting the regular spinning mode, the disk control instructing unit 104 instructs the disk control unit 114 of the disk array system 112 to stop spinning of the disk device that configures the corresponding LU (i.e., the LU whose regular spinning mode is unset), and sets the spinning stop time 407 in the volume management information 401 (s1204). In the disk control unit 114 having received the instruction from the disk control instructing unit 104, the disk spinning managing unit 115 stops the spinning of the disk device that configures the LU. In addition, the spinning of the disk device can be stopped according to the process sequence shown in FIG. 6 by omitting step s1203.

According to Embodiment 5, since the LU for storing the WORM data or the WORM data is stored in LU whose regular spinning flag 405 is set to "0", it is possible to stop spinning of the disk device that configures the LU. Accordingly, it is possible to reduce the power consumption of the NAS system.

What is claimed is:

1. A system for storing data of a file system comprising:
a controller controlling the file system; and
a disk array system storing data of the file system,
wherein the disk array system includes a plurality of logical volumes, each of which is configured by using a disk device, and a disk controller controlling data input/output to/from the plurality of logical volumes,
wherein the plurality of logical volumes includes at least one first type logical volume configured by a disk device, which is controlled to spin down or up according to a last access time to the first type logical volume, and at least one second type logical volume configured by a disk device, which is controlled not to spin down according to a last access time to the second type logical volume,
wherein the controller is configured to store data satisfying a predetermined condition in the second type logical volume,
wherein the controller is configured to store data, whose access frequency is higher than a predetermined criterion in the second type logical volume,
wherein the controller is configured to store metadata of the file system in the second type logical volume,
wherein the controller includes a metadata cache unit for storing metadata of the file system, and
when an access request for a file of the file system is received, the controller is configured to check whether metadata used to confirm a storage location of the file is stored in the metadata cache unit or not,
if the metadata is stored in the metadata cache unit, the controller is configured to specify a logical volume of the disk array system, in which the file is stored, by using the metadata in the metadata cache unit,
if the metadata is not stored in the metadata cache unit, the controller is configured to specify a logical volume of the disk array system, in which the file is stored, by using the metadata in a logical volume of the disk array system, and
the controller is configured to issue an access request for a specified logical volume to access data of the file.

2. A system according to claim 1, wherein after specifying the logical volume, the controller is configured to check whether a disk of a disk device, which configures the specified logical volume, is spinning or not, and
if the disk of the disk device is not spinning, the controller is configured to issue an instruction to the disk controller to spin up the disk device, and issue the access request to the disk controller after the instruction.

3. A system according to claim 1, wherein the controller includes file system management information indicating correspondence between a file system and a controller controlling the corresponding file system, and if the access request received at the controller is an access request for data of a file system controlled by another controller, the controller is configured to transfer the received access request to the another controller.

4. A system according to claim 1, wherein the controller includes file system management information indicating correspondence between a file system and a controller controlling the corresponding file system, and if the access request received at the controller is an access request for data of a file system controlled by another controller, the controller is configured to instruct a computer, which issues the access request, to send the access request to the another controller.

5. A system according to claim 4, wherein the controller is further configured to transfer the access request to the another controller, and instruct the another controller to make a disk device, which configures a logical volume storing target data of the access request, to spin up.

* * * * *